US012694082B2

(12) United States Patent　　(10) Patent No.:　US 12,694,082 B2

Chodroff et al.　　(45) Date of Patent:　Jul. 28, 2026

(54) USER VERIFICATION WITH NON-FUNGIBLE TOKENS

(71) Applicant: HSBC Software Development (Guangdong) Limited, Guangzhou (CN)

(72) Inventors: Benjamin Evans Chodroff, Shanghai (CN); Yong Xia, Shanghai (CN); Wei Ming Zhuang, Shanghai (CN); Ying Li Liu, Guangzhou (CN)

(73) Assignee: HSBC Software Development (Guangdong) Limited, Guangzhou (CN)

( * ) Notice: Subject to any disclaimer, the term of this patent is extended or adjusted under 35 U.S.C. 154(b) by 174 days.

(21) Appl. No.: 18/462,864

(22) Filed: Sep. 7, 2023

(65) Prior Publication Data

US 2024/0086503 A1　　Mar. 14, 2024

Related U.S. Application Data

(60) Provisional application No. 63/375,279, filed on Sep. 12, 2022.

(51) Int. Cl.
　　*G06F 21/31*　　(2013.01)
　　*G06F 16/27*　　(2019.01)

(52) U.S. Cl.
　　CPC .............. *G06F 21/31* (2013.01); *G06F 16/27* (2019.01)

(58) Field of Classification Search
　　CPC .......... G06F 21/31; G06F 16/27; G06F 21/40; G06Q 10/103; G06Q 30/018; G06Q 50/18;

(Continued)

(56) References Cited

U.S. PATENT DOCUMENTS

2019/0287175 A1　　9/2019　Hill et al.
2021/0357893 A1*　11/2021　Kang ................. G06Q 20/1235
　　　　　　　　　　　　　(Continued)

FOREIGN PATENT DOCUMENTS

WO　　2016022791　　2/2016
WO　　2023154940　　8/2023

OTHER PUBLICATIONS

International Search Report and Written Opinion for Application No. PCT/IB2023/058882, mailed on Dec. 12, 2023, 14 Pages.

*Primary Examiner* — Christopher B Robinson
*Assistant Examiner* — Tania M Pena-Santana
(74) *Attorney, Agent, or Firm* — Dentons Durham Jones Pinegar

(57)　　ABSTRACT

A computing system receives a request to verify a user, the request comprising an indication of a jurisdiction in which the user will be verified. Based on the request, the computing system collects information related to the user. Based on the request, the computing system identifies a workflow corresponding to the jurisdiction. The workflow defines conditions for obtaining a verified status in the jurisdiction. The computing system executes the workflow to verify the user. The computing system hashes the verification record using a zero-knowledge proof protocol. The computing system generates a non-fungible token corresponding to the verification record. The non-fungible token is associated with a hashed version of the verification record. The computing system broadcasts the non-fungible token to a blockchain.

20 Claims, 6 Drawing Sheets

400

Begin

Receive a request to verify a user — 402

Collect assets related to the user — 404

Convert assets into a format compatible with a desired jurisdiction — 406

Generate an initial output for subsequent review — 408

Receive confirmation that the initial output is correct — 410

Generate verification document based on confirmation — 412

Hash and store the verification document — 414

Generate a token corresponding to the verification document — 416

Broadcast the token to the blockchain — 418

End

(58) Field of Classification Search
CPC ...... G06Q 50/265; G06Q 40/04; G06Q 50/40;
H04L 9/50
See application file for complete search history.

(56) References Cited

U.S. PATENT DOCUMENTS

| | | | |
|---|---|---|---|
| 2022/0198562 A1* | 6/2022 | Cella ..................... | G06Q 40/04 |
| 2022/0309491 A1* | 9/2022 | Shapiro ................... | G06F 21/64 |
| 2022/0391982 A1 | 12/2022 | Hill et al. | |
| 2023/0086191 A1* | 3/2023 | Jakobsson ............. | H04L 9/3231 |
| | | | 705/66 |
| 2024/0193586 A1* | 6/2024 | Nohara ................... | G06F 21/31 |
| 2025/0272681 A1* | 8/2025 | Bansal ................... | G06Q 20/36 |

* cited by examiner

FIG. 3
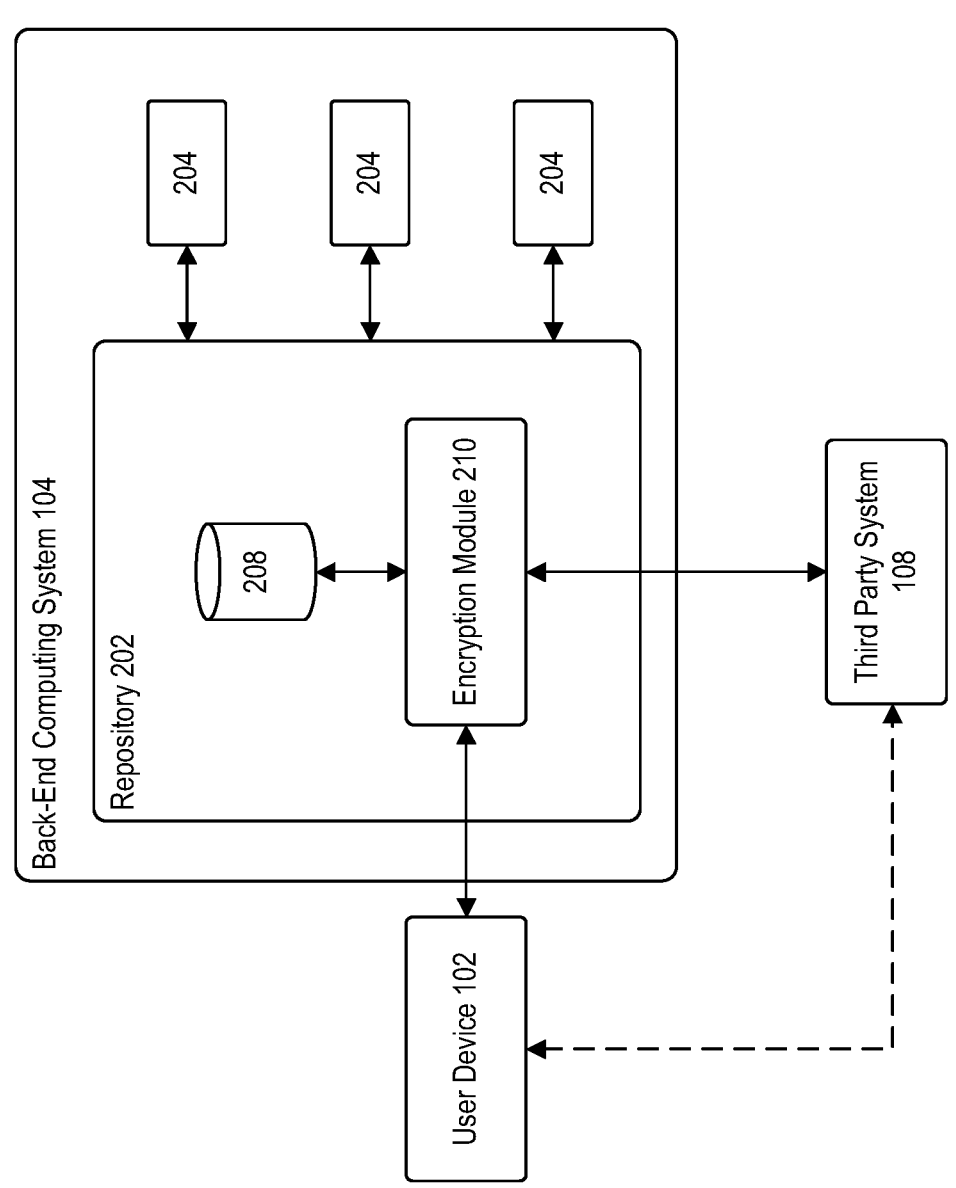
300

400

500

USER VERIFICATION WITH NON-FUNGIBLE TOKENS

CROSS-REFERENCE TO RELATED APPLICATIONS

This application claims priority to U.S. Provisional Application Ser. No. 63/375,279 filed Sep. 12, 2022, which is hereby incorporated by reference in its entirety.

FIELD OF THE DISCLOSURE

Embodiments disclosed herein generally relate to a system and method for using a non-fungible token for authenticating a user across jurisdictions.

BACKGROUND

Verifying users to entities can be a time-consuming process. If a user is seeking verification with more than one entity, such as various different jurisdictions, the user may be required to satisfy the various requirements of each entity in order to attain a verified or accredited status for that entity or jurisdiction.

SUMMARY

In some embodiments, a method for verifying a user is disclosed herein. A computing system receives a request to verify a user. The request includes an indication of a jurisdiction in which the user will be verified. Based on the request, the computing system collects information related to the user. Based on the request, the computing system identifies a workflow corresponding to the jurisdiction. The workflow defines conditions for obtaining a verified status in the jurisdiction. The computing system executes the workflow to verify the user. Executing the workflow includes comparing the information related to the user to the conditions defined in the workflow, determining a verification status of the user based on the comparing, and generating a verification record based on the verification status. The verification record includes the information considered during the comparing. The computing system hashes the verification record using a zero-knowledge proof protocol. The computing system generates a non-fungible token corresponding to the verification record. The non-fungible token is associated with a hashed version of the verification record. The computing system broadcasts the non-fungible token to a blockchain.

In some embodiments, a non-transitory computer readable medium is disclosed herein. The non-transitory computer readable medium includes one or more sequences of instructions, which, when executed by a processor, causes a computing system to perform operations. The operations include receiving, by the computing system, a request to verify a user. The request includes an indication of a jurisdiction in which the user will be verified. The operations further include, based on the request, collecting, by the computing system, information related to the user. The operations further include, based on the request, identifying, by the computing system, a workflow corresponding to the jurisdiction. The workflow defines conditions for obtaining a verified status in the jurisdiction. The operations further include executing, by the computing system, the workflow to verify the user. Executing the workflow includes comparing the information related to the user to the conditions defined in the workflow, determining a verification status of the user based on the comparing, and generating a verification record based on the verification status, wherein the verification record comprises the information considered during the comparing. The operations further include hashing, by the computing system, the verification record using a zero-knowledge proof protocol. The operations further include generating, by the computing system, a non-fungible token corresponding to the verification record. The non-fungible token is associated with a hashed version of the verification record. The operations further include broadcasting, by the computing system, the non-fungible token to a blockchain.

In some embodiments, a system is disclosed herein. The system includes a processor and a memory. The memory has programming instructions stored thereon, which, when executed by the processor, causes the system to perform operations. The operations include receiving a request to verify a user. The request includes an indication of a jurisdiction in which the user will be verified. The operations further include, based on the request, collecting information related to the user. The operations further include, based on the request, identifying a workflow corresponding to the jurisdiction. The workflow defines conditions for obtaining a verified status in the jurisdiction. The operations further include executing the workflow to verify the user. Executing the workflow includes comparing the information related to the user to the conditions defined in the workflow, determining a verification status of the user based on the comparing, and generating a verification record based on the verification status. The verification record includes the information considered during the comparing. The operations further include hashing the verification record using a zero-knowledge proof protocol. The operations further include generating a non-fungible token corresponding to the verification record. The non-fungible token is associated with a hashed version of the verification record. The operations further include broadcasting the non-fungible token to a blockchain.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

FIG. 3 is a block diagram illustrating back-end computing system, according to example embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
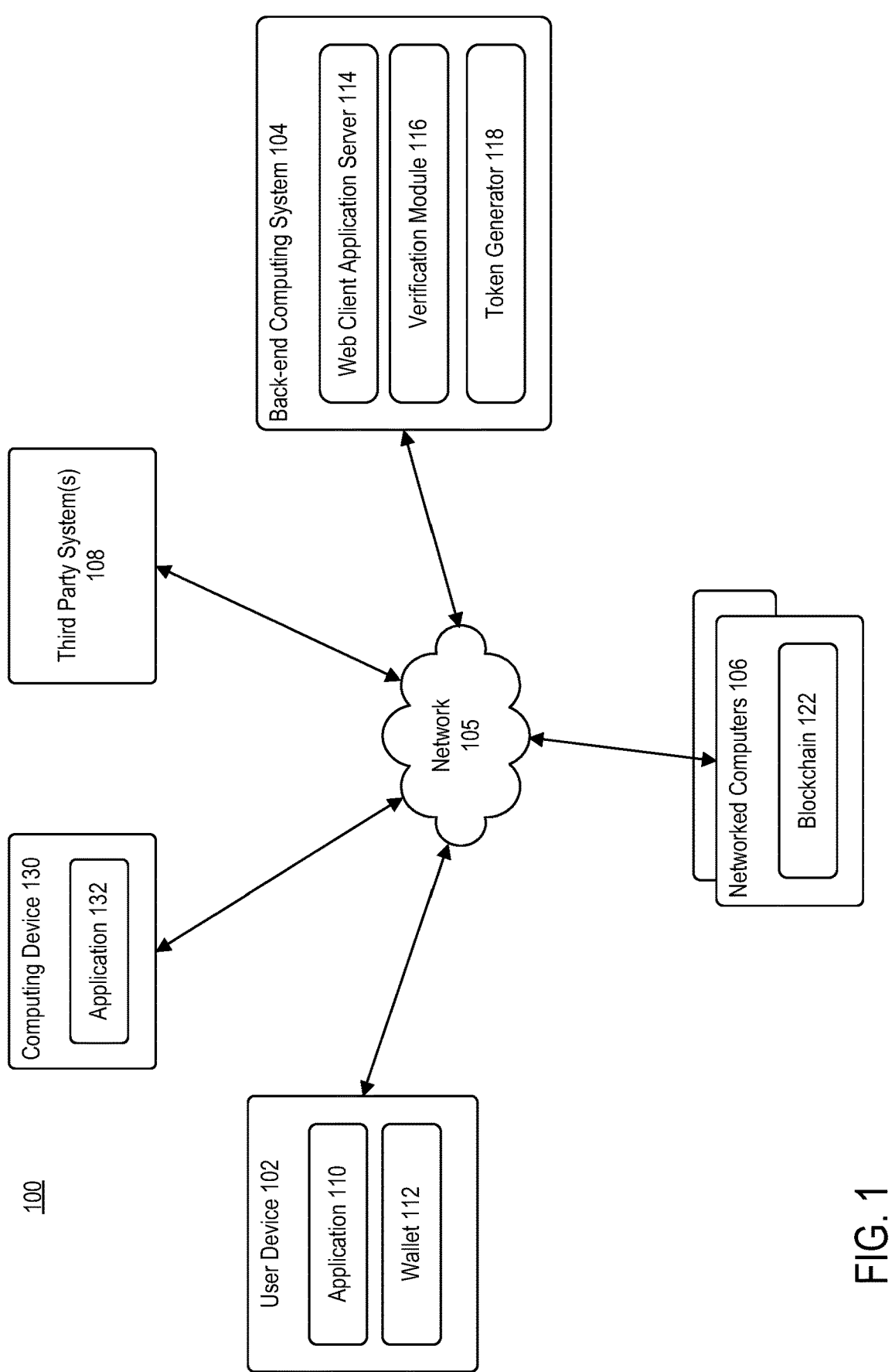
FIG. 1 is a block diagram illustrating a computing environment, according to example embodiments.

Depending on the jurisdiction, for certain assets, a person or entity may not be allowed to invest or trade in those assets unless they are an accredited or verified investor. An accredited or verified investor may refer to an individual or entity that satisfies the various income and/or net worth guidelines in order to be able to invest in certain unregulated or risky assets. For example, in the United States, one way a person may be able to authenticate themselves as an accredited investor is if the individual can show that they maintain a net worth of one million dollars, not including the value of their primary residence. In order to become an accredited or verified investor, conventionally, a person or entity would have to interact with a third party service, such as Verify-Investor. Using such third party services, a person or entity would upload personal financial information to an online portal for the third party service. A verifier, such as an attorney, would analyze the personal financial information that was uploaded and can generate a verification certificate. The verification certificate may indicate that the individual is deemed an accredited or verified investor for a given jurisdiction.

For certain companies or entities looking to field investments, ensuring that each of their investors are accredited or verified is critical. For example, if a company or entity is audited, a governmental agency (e.g., United States Security and Exchange Commission) may view the investment records of the company or entity to ensure that each investor was indeed accredited or verified. Failing to verify or authenticate their investors can pose severe fines against the company or entity.

There are several limitations to conventional approaches of authenticating or accrediting investors. First, individual investors are required to upload sensitive personal identification information to third party platforms in order for the third party platforms to determine whether they qualify as an accredited or verified investor. As indicated above, conventionally, an individual would need to upload sensitive financial information and/or personal identification information, such as, but not limited to W2 forms, K1 forms, 1099 forms, and the like. Such information can be prone to data leakage during transmission from the user to the third party platform or during storage of the information by the third party platform.

Second, individual investors are required to obtain an accredited or verified status for each jurisdiction. For example, in the United States, the user would need to obtain a first accredited investor certification based on the United States' standards; similarly, the same user would need to obtain a second accredited investor certification based on Hong Kong's standards. Such a process creates additional work for the individual to obtain accredited status in multiple jurisdictions.

One or more techniques disclosed herein improve upon conventional processes by utilizing a non-fungible token to prove to entities that the individual is an accredited or verified investor. For example, rather than utilize a third party service for accreditation, the user may be able to use their financial institution to perform the accreditation process. Such reliance on a pre-established relationship can aid in reducing the possibility for sensitive personal or financial information being leaked during the accreditation process or subsequently when the user's personal or financial information is stored.

Additionally, by utilizing a non-fungible token, a user can now utilize a single instrument for verification in multiple regions. For example, during the accreditation phase, a user can indicate to their financial institutions the various jurisdictions in which they are to be accredited. The financial institution can generate a legal statement that proves the user's accredited investor status in the indicated jurisdictions. Such accreditation can be issued as a non-fungible token.

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described.

FIG. 1 is a block diagram illustrating a computing environment 100, according to one embodiment. Computing environment 100 may include at least a user device 102, a back-end computing system 104, networked computers 106, and one or more third party systems 108 communicating via network 105.

Network 105 may be representative of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may be representative of the Internet, a private data network, virtual private network using a public network and/or other suitable connection(s) that enables components in computing environment 100 to send and receiving information between the components of computing environment 100.

User device 102 may be operated by a user. Exemplary users may include, but are not limited to, an investor seeking to obtain accredited investor status from back-end computing system 104. In some embodiments, user device 102 may be representative of one or more computing devices, such as, but not limited to, a mobile device, a tablet, a personal computer, a laptop, a desktop computer, or, more generally, any computing device or system having the capabilities described herein.

User device 102 may include application 110 and wallet 112. Application 110 may be associated with back-end computing system 104 through which a user may request accredited investor status. In some embodiments, application 110 may be a standalone application associated with back-end computing system 104. In some embodiments, application 110 may be representative of a web-browser configured to communicate with back-end computing system 104. For example, user device 102 may be configured to execute application 110 to access a portal provided by back-end computing system 104 for the user to request accreditation or verification of their status as an investor. In some embodiments, user device 102 can execute application 110 such that a user can upload any financial documents to back-end computing system 104. The content that is displayed to the user via user device 102 may be transmitted from web client application server 114 of back-end computing system 104 to user device 102, and subsequently processed by application 110 for display through a graphical user interface (GUI).

Wallet 112 may be configured to store a user's fungible tokens (e.g., cryptocurrency) and non-fungible tokens in an encrypted manner. In some embodiments, wallet 112 may be representative of a hot wallet, which is a cryptographic wallet connected to a network, such as network 105. In some embodiments, wallet 112 may be representative of a cold wallet, which is not connected to a network. In some embodiments, rather than deploying a separate wallet (e.g., Metamask, Ledger Nano X, etc.), wallet 112 may be representative of a wallet associated with back-end computing system 104.

Networked computers 106 may be configured to host blockchain 122. In some embodiments, blockchain 122 may be a public blockchain. In some embodiments, blockchain 122 may be a private blockchain, such as, for example, a private blockchain associated with back-end computing system 104. Generally, blockchain 122 may be representative of any blockchain configured to support non-fungible tokens. For example, blockchain 122 may be a public or private blockchain based on the Ethereum platform.

Back-end computing system 104 may be configured to communicate with one or more user devices 102 and/or blockchain 122. Back-end computing system 104 may include a web client application server 114, verification module 116, and token generator 118. Each of verification module 116 and token generator 118 may be comprised one or more software modules. The one or more software modules are collections of code or instructions stored on a media (e.g., memory of back-end computing system 104) that represent a series of machine instructions (e.g., program code) that implements one or more algorithmic steps. Such machine instructions may be the actual computer code the processor of back-end computing system 104 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather than as a result of the instructions.

Verification module 116 may be configured to facilitate an accreditation or verification workflow for accrediting or verifying the investor status of an individual or entity. For example, verification module 116 may be configured to generate a portal, in which a user can initiate an accreditation process. For example, verification module 116 may prompt the user to indicate the jurisdictions in which the user would like to be accredited. In some embodiments, indicating the jurisdictions may include the user indicating their accounts in each of the identified jurisdictions. For example, for United States accreditation, the user may indicate three accounts based in the United States; similarly, for Hong Kong accreditation, the user may indicate four accounts based in Hong Kong.

In some embodiments, verification module 116 may further prompt the user to link or indicate additional evidence that may be considered for accreditation status. For example, verification module 116 may prompt the user to upload information associated with external accounts (i.e., accounts not managed by an entity associated with back-end computing system 104), cryptocurrency holdings, and the like.

Based on the asset information provided to verification module 116, verification module 116 may execute a workflow that determines whether the user qualifies for accredited investor status in each of the identified jurisdictions. In some embodiments, verification module 116 may include a workflow for each jurisdiction. For example, for the United States, verification module 116 may execute a first workflow that compares the user's financial asset information to the various rules and regulations for accredited investor status in the United States. Similarly, in another example, verification module 116 may execute a second workflow that compares the user's financial asset information to the various rules and regulations for accredited investor status in Hong Kong.

In some embodiments, such as when the user is requesting accreditation in a foreign jurisdiction or the user has multiple accounts across multiple jurisdictions, verification module 116 may convert the user's assets to the local currency of the jurisdiction being considered. For example, assuming the user is interested in accreditation status in both the United States and Hong Kong, verification module 116 may generate a first total amount of the user's assets in US dollars and a second total amount of the user's assets in Hong Kong dollars.

As output from the workflow, verification module 116 may generate an initial indication regarding whether the user satisfies the accredited investor requirements. An attorney may then review the output and provide their approval. For example, as shown, in some embodiments, computing environment 100 may further include computing devices 130. Computing devices 130 may be representative of computing devices associated with attorneys that are hired to review the outputs generated by verification module 116.

As shown, computing device 130 may include an application 132. Application 132 may be associated with back-end system. In some embodiments, application 132 may be a standalone application associated with back-end computing system 104. In some embodiments, application 132 may be representative of a web-browser configured to communicate with back-end computing system 104. For example, computing device 130 may be configured to execute application 132 to access a portal provided by back-end computing system 104 for the attorney to review the initial output generated by verification module 116. Based on the review, the attorney can either verify the output generated by verification module 116 or reject the output generated by verification module 116. The content that is displayed to the user via computing device 130 may be transmitted from web client application server 114 of back-end computing system 104 to computing device 130, and subsequently processed by application 132 for display through a graphical user interface (GUI).

Referring back to verification module 116, verification module 116 may be configured to generate a document based on the attorney's approval. In some embodiments, verification module 116 may be configured to generate a document that includes the assets considered, the exchange rates, and the attorney's signature of approval. In some embodiments, the document may be a PDF. In some embodiments, each jurisdiction may have its own respective verification document corresponding thereto. In some embodiments, each jurisdiction may be reflected in a single verification document.

Token generator 118 may be configured to generate a token representative of the user's accredited investor status. To generate the token, in some embodiments, token generator 118 may first hash the document generated by verification module 116. Hashing the document may ensure that sensitive information associated with the user, such as their personal identification information and asset information are obfuscated from third parties. Token generator 118 may hash the verification document with a private key that is unique to the entity associated with back-end computing system 104. In this manner, the entity associated with back-end computing system 104 can effectively vouch for the validity of the accredited investor status, without revealing the user's sensitive information, by simply confirming that the verification document was hashed using the entity's private key.

Token generator 118 may further be configured to generate a non-fungible token that represents the user's accredited investor status. In some embodiments, the non-fungible token may be representative of an ERC721 contract. In some embodiments, the smart contract may be representative of an ERC1155 contract.

In some embodiments, the hashed verification document may be stored off-chain. For example, the non-fungible token may include a uniform resource identifier corresponding to a storage location where the hashed verification document is stored. In some embodiments, the hashed verification document may be stored on a secure server associated with back-end computing system 104. In some embodiments, the hashed verification document may be stored on a decentralized server, such as the InterPlanetary File System (IPFS). In some embodiments, a single non-fungible token may indicate that the user has accredited investor status in two or more jurisdictions. In such embodiments, the non-fungible token may link to two storage locations: a first storage location corresponding to the first hashed verification document and a second storage location corresponding to a second hashed verification document.

In some embodiments, the hashed verification document (or documents) may be stored on-chain. For example, the hashed verification document and the non-fungible token corresponding thereto may be stored directly on blockchain 122. In such embodiments, the hashed verification document may be in the metadata of the non-fungible token. In this manner, rather than the metadata of the non-fungible token linking to a storage location where the hashed verification document may be found, the contents of the hashed verification document may be embedded into the non-fungible token as metadata. Similarly, in some embodiments, a single non-fungible token may indicate that the user has accredited investor status in two or more jurisdictions. In such embodiments, the non-fungible token may include the contents of both hashed verification documents.

Once the non-fungible token is generated, token generator 118 may broadcast or write the token to blockchain 122. Token generator 118 may then transfer the non-fungible token to wallet 112 of the user.

In some embodiments, one or more third party systems 108 may be representative of one or more entities to which the user may provide with their accredited investor status. For example, a user may provide third party system 108 with an indication of the non-fungible token corresponding to their verified investor status. In some situations, a third party system 108 may request that back-end computing system 104 verify that the verified investor status is correct. In such embodiments, back-end computing system 104 may utilize a zero-knowledge proof to confirm that the information contained or represented by the non-fungible token is true, without conveying the underlying data to the third party system 108.

Figure 2:
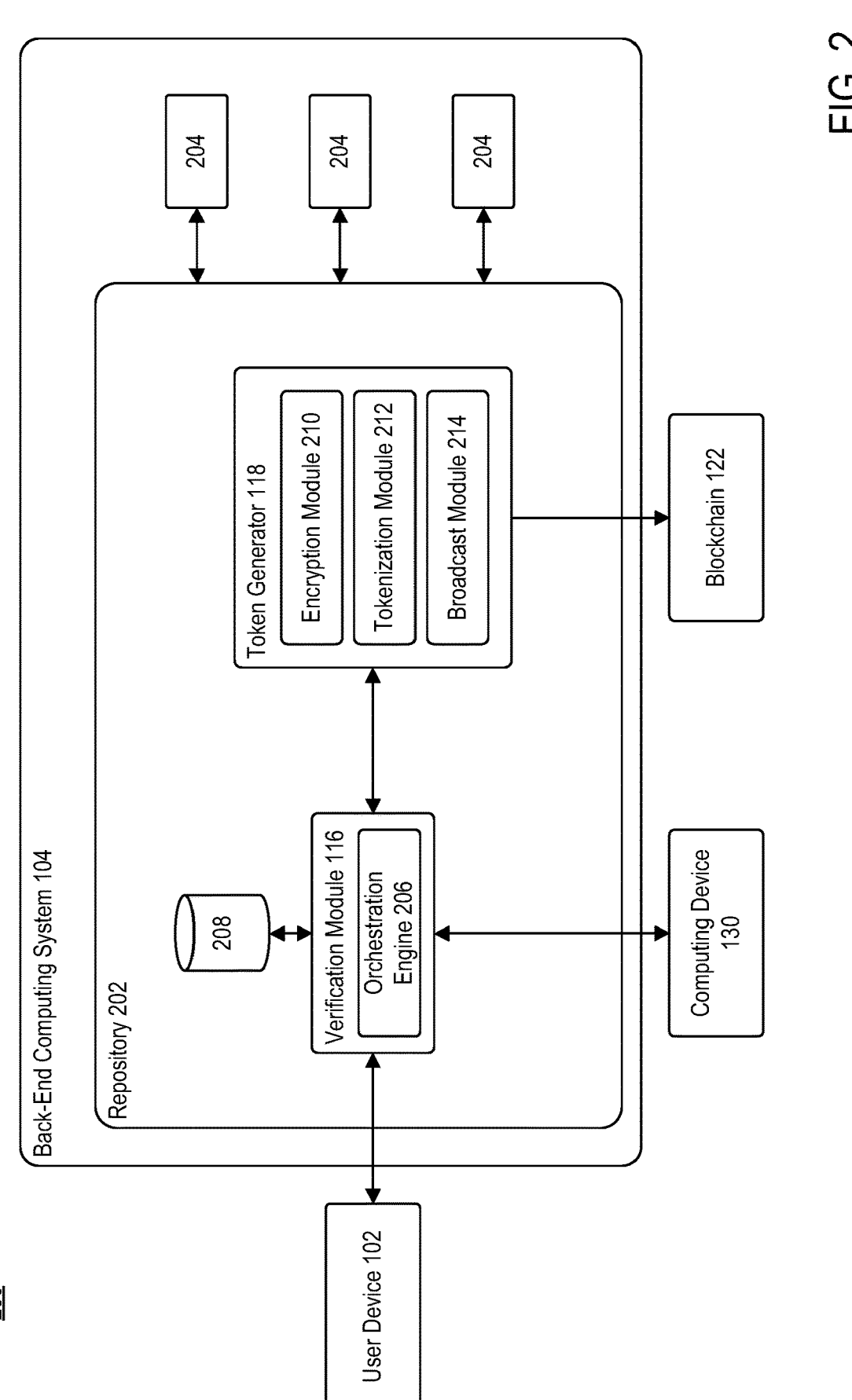
FIG. 2 is a block diagram illustrating back-end computing system, according to example embodiments.

FIG. 2 is a block diagram 200 illustrating back-end computing system 104, according to example embodiments. As shown, back-end computing system 104 includes repository 202 and one or more computer processors 204.

Repository 202 may be representative of any type of storage unit and/or device (e.g., a file system, database, collection of tables, or any other storage mechanism) for storing data. Further, repository 202 may include multiple different storage units and/or devices. The multiple different storage units and/or devices may or may not be of the same type or located at the same physical site. As shown, repository 202 includes at least verification module 116 and token generator 118.

Verification module 116 may include orchestration engine 206. Orchestration engine 206 may be comprised one or more software modules. The one or more software modules are collections of code or instructions stored on a media (e.g., memory of back-end computing system 104) that represent a series of machine instructions (e.g., program code) that implements one or more algorithmic steps. Such machine instructions may be the actual computer code the processor of back-end computing system 104 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather than as a result of the instructions.

In operation, verification module 116 may receive a request from user device 102 to generate a verification token for the user. The verification token may be used by the user to verify themselves as an accredited investor to third parties. Orchestration engine 206 may be configured to execute one or more workflows associated with verifying an investor status of the user. For example, based on the request, orchestration engine 206 may identify one or more workflows relevant to the user's request. Such workflows may be stored in repository 208.

Using a specific example, if the user requests for verification in two jurisdictions—a first jurisdiction and a second jurisdiction, orchestration engine 206 may be configured to identify a first workflow associated with the first jurisdiction and a second workflow associated with the second jurisdiction. Generally, a workflow may include the requirements set forth by the jurisdiction for attaining accredited investor status in that jurisdiction.

Once the workflow is identified, orchestration engine 206 may be configured to execute the workflow. For example, orchestration engine 206 may be configured to collect or gather asset information of assets related to the user. In some embodiments, orchestration engine 206 may obtain assets from repository 208. In some embodiments, orchestration engine 206 may obtain assets from the user via upload. Once obtained, orchestration engine 206 may compare the user's financial assets to the requirements of the jurisdiction set forth in the workflow. In some embodiments, orchestration engine 206 may initiate a conversion of the user's financial assets to a format or currency compatible with the intended jurisdiction.

As output from the workflow, orchestration engine 206 may generate an initial assessment of the user's accreditation status.

Once the initial assessment of the user's accreditation status is generated, orchestration engine 206 may provide the initial assessment to computing device 130. In some embodiments, providing the initial assessment to computing device 130 may include generating an encrypted portal through which an attorney at computing device 130 can review the initial assessment for validation. Assuming the attorney verifies the initial assessment of the user's accreditation statue, orchestration engine 206 may generate a verification document corresponding to the user's accreditation status.

Token generator 118 may be configured to generate a non-fungible token corresponding to the verification document. As shown, token generator 118 may include an encryption module 210, tokenization module 212, and broadcast module 214. Each of encryption module 210, tokenization module 212, and broadcast module 214 may be comprised one or more software modules. The one or more software modules are collections of code or instructions stored on a media (e.g., memory of back-end computing system 104) that represent a series of machine instructions (e.g., program code) that implements one or more algorithmic steps. Such machine instructions may be the actual computer code the processor of back-end computing system 104 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather than as a result of the instructions.

Encryption module 210 may be configured to generate a hashed representation of the verification document. For example, encryption module 210 may utilize a hash function, such that a zero-knowledge proof may be employed to verify that the verification document is correct, without disclosing the exact details.

Tokenization module 212 may be configured to generate a non-fungible token corresponding to verification document or the hashed verification document. In some embodiments, the hashed version of the verification document may be stored off-chain, and a URI corresponding to the storage location of the hashed version of the verification document may be included in the metadata of the non-fungible token. In some embodiments, the hashed version of the verification document may be stored on-chain by including the hashed contents in the metadata of the non-fungible token. In some embodiments, tokenization module 212 may provide the user with the non-fungible token, such that the user can store the non-fungible token in their wallet 112.

Broadcast module 214 may be configured to write or broadcast the non-fungible token to blockchain 122.

FIG. 3 is a block diagram 300 illustrating back-end computing system 104, according to example embodiments. As shown, FIG. 3 may represent a process in which a third party system 108 requests back-end computing system 104 to verify the user's accreditation status.

As shown, a user of user device 102 may attempt to provide third party system 108 with proof that they are an accredited investor. In some embodiments, the user of user device 102 may provide third party system 108 with the non-fungible token corresponding to their verification document. In some embodiments, a third party system 108 may attempt to verify that the user is in fact an accredited investor. By using the non-fungible token, back-end computing system 104 may be able to confirm the status of the user without providing third party system 108 with any personal identification information or financial information of the user. Instead, back-end computing system 104 may simply attest to the verification.

As shown, third party system 108 may submit a request to back-end computing system 104 to verify a non-fungible token corresponding to the user. In some embodiments, such as when the verification document is stored off-chain, encryption module 210 may identify the storage location (e.g., repository 208) of the verification document based on the URI contained in the metadata of the non-fungible token. If encryption module 210 determines that the verification document was hashed using a private key associated with back-end computing system 104, then back-end computing system 104 may simply confirm the status of the user.

In some embodiments, such as when the verification document is stored on-chain, encryption module 210 may identify the hashed representation of the verification document in the metadata of the non-fungible token. Similar to the above process, if encryption module 210 determines that the verification document was hashed using a private key associated with back-end computing system 104, then back-end computing system 104 may simply confirm the status of the user.

As indicated above, such verification is performed without revealing any sensitive information associated with the user.

Figure 4:
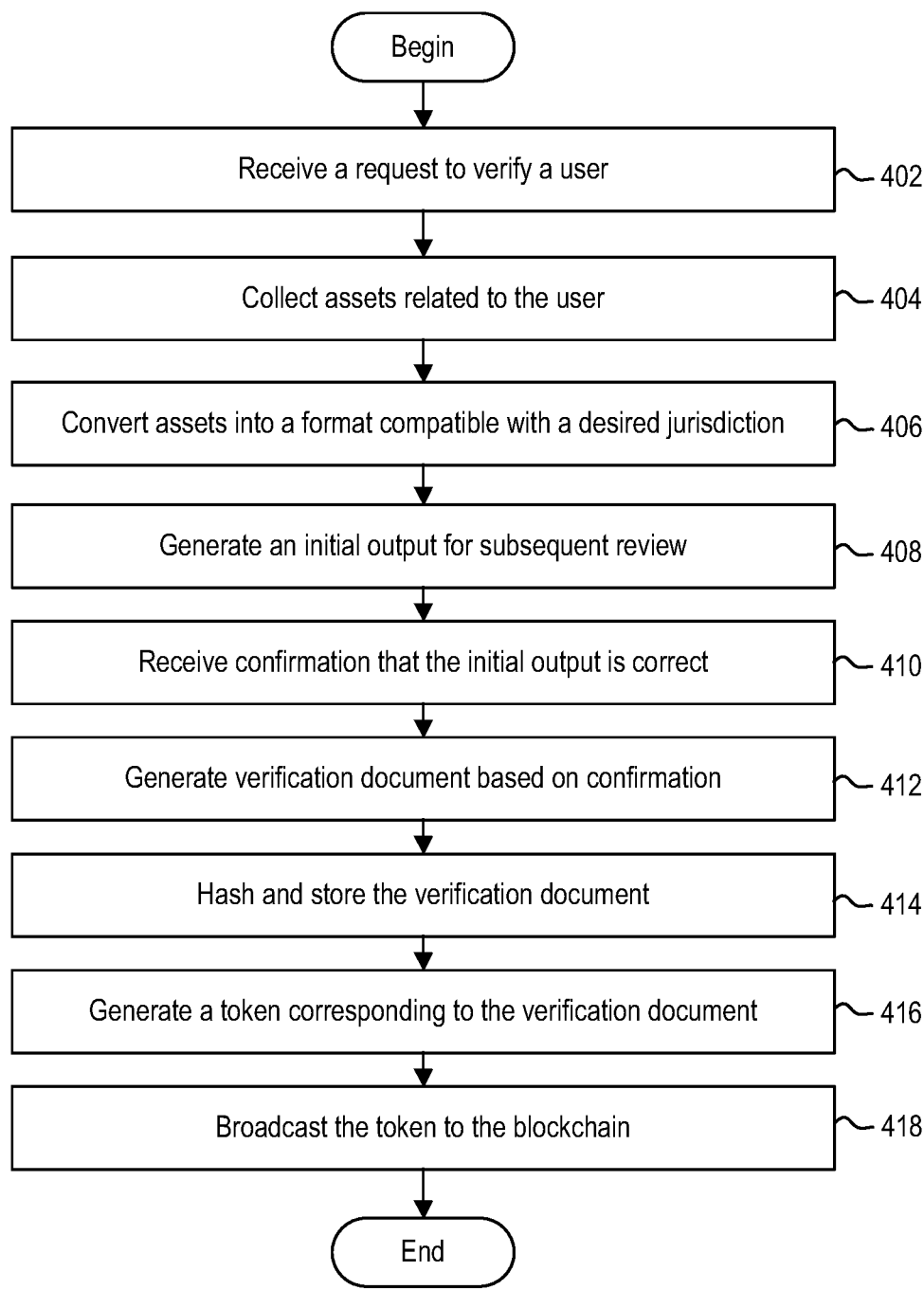
FIG. 4 is a flow diagram illustrating a method of verifying a user, according to example embodiments.

FIG. 4 is a flow diagram illustrating a method 400 of verifying a user, according to example embodiments. Method 400 may begin at step 402.

At step 402, back-end computing system 104 may receive a request to verify the user. For example, back-end computing system 104 may receive a request from user device 102 to verify the user for purposes of attaining an accredited investor status. In some embodiments, the request may include an indication a jurisdiction or jurisdictions in which the user would like to be accredited. For example, the user may request accreditation in the United States and Hong Kong.

At step 404, back-end computing system 104 may collect assets related to the user. In some embodiments, back-end computing system 104 may identify one or more accounts of the user that are managed by back-end computing system 104. In some embodiments, back-end computing system 104 may prompt the user to upload information from any additional accounts of the user that may not be managed by back-end computing system 104. For example, back-end computing system 104 may prompt the user to upload information associated with external accounts (i.e., accounts not managed by an entity associated with back-end computing system 104), cryptocurrency holdings, and the like.

At step 406, back-end computing system 104 may convert the assets into a format compatible with each desired jurisdiction. For example, if the user has accounts that include assets in multiple currencies, back-end computing system 104 may convert all assets to the currency of each desired jurisdiction. Continuing with the above example, back-end computing system 104 may convert the user's assets into US dollars and Hong Kong dollars.

At step 408, back-end computing system 104 may generate an initial output for further review. For example, if the user requests verification in two jurisdictions—a first jurisdiction and a second jurisdiction, back-end computing system 104 may identify a first workflow associated with the first jurisdiction and a second workflow associated with the second jurisdiction. Each workflow may include the requirements set forth by the jurisdiction for attaining accredited investor status in that jurisdiction. Once the workflow is identified, back-end computing system 104 may execute the workflow. For example, back-end computing system 104 may compare the user's financial assets to the requirements of the jurisdiction set forth in the workflow. As output from the workflow, back-end computing system 104 may generate an initial assessment of the user's accreditation status.

At step 410, back-end computing system 104 may receive confirmation that the initial assessment is correct. For example, back-end computing system 104 may provide the initial assessment to computing device 130, such that an attorney may then review the output and provide their approval.

At step 412, back-end computing system 104 may generate a verification document based on the confirmation. For example, back-end computing system 104 may generate a verification document based on the attorney's approval. In some embodiments, back-end computing system 104 may generate a verification document that includes the assets considered, the exchange rates, and the attorney's signature of approval. In some embodiments, the document may be a PDF. In some embodiments, each jurisdiction may have its own respective verification document corresponding thereto. In some embodiments, each jurisdiction may be reflected in a single verification document.

At step 414, back-end computing system 104 may hash the verification document and store the hashed verification document. Hashing the document may ensure that sensitive information associated with the user, such as their personal identification information and asset information are obfuscated from third parties. Back-end computing system 104 may hash the verification document with a private key that is unique to the entity associated with back-end computing system 104. For example, back-end computing system 104 may use a zero knowledge proof protocol to hash the verification document.

At step 416, back-end computing system 104 may generate a token corresponding to the verification document. For example, back-end computing system 104 may generate a non-fungible token that represents the user's accredited investor status. In some embodiments, the non-fungible token may be representative of an ERC721 contract. In some embodiments, the smart contract may be representative of an ERC1155 contract.

At step 418, back-end computing system 104 may broadcast the token to blockchain 122.

Figure 5:
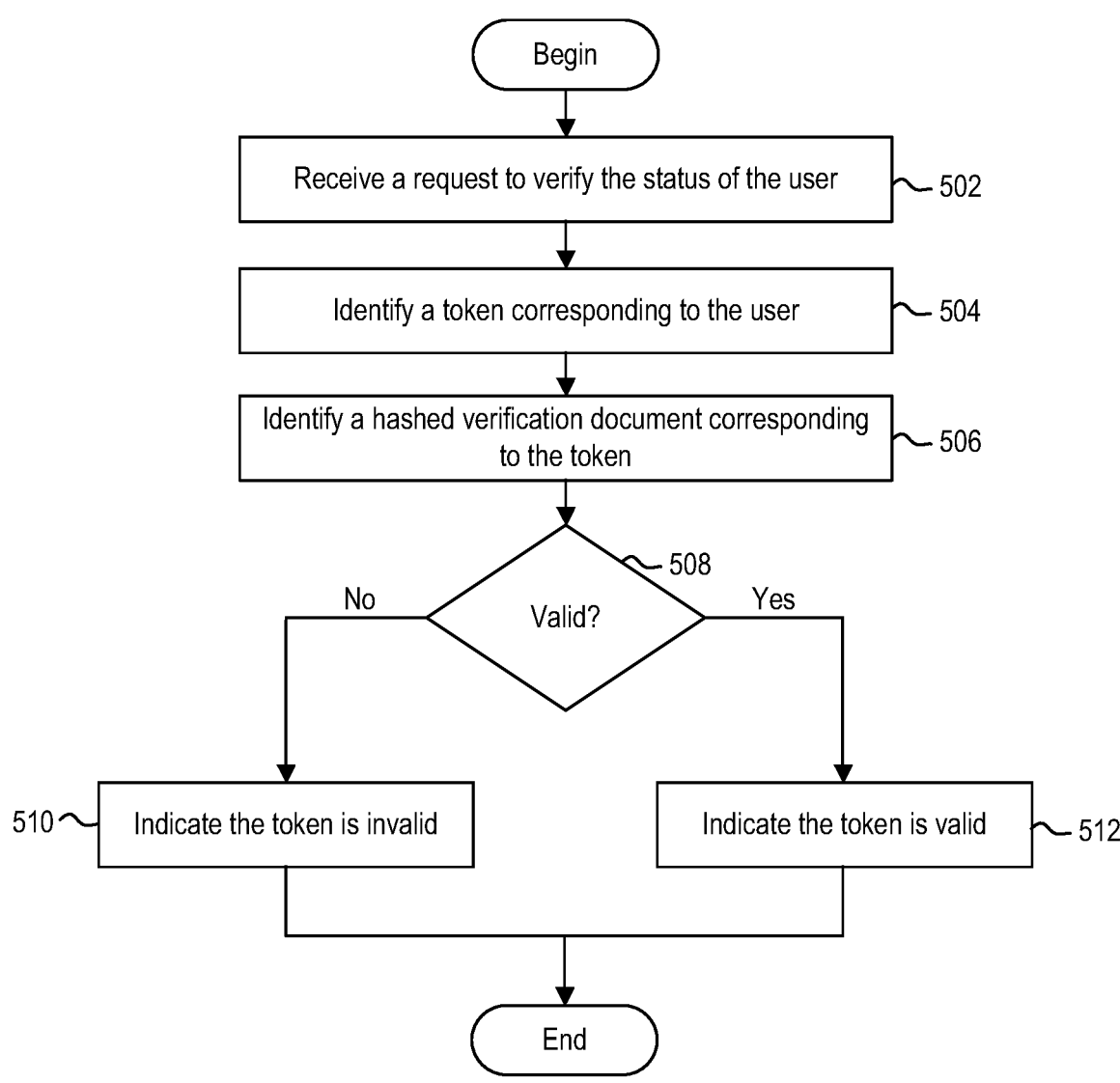
FIG. 5 is a flow diagram illustrating a method of confirming an accredited status of a user, according to example embodiments.

FIG. 5 is a flow diagram illustrating a method 500 of confirming an accredited status of a user, according to example embodiments. Method 500 may begin at step 502.

At step 502, back-end computing system 104 may receive a request to verify a status of a user. For example, a user may attempt to invest with an entity associated with a third party system 108. Third party system 108 may be undergoing an audit or may merely wish to verify the status of the user.

At step 504, back-end computing system 104 may identify a token corresponding to the user. In some embodiments, third party system 108 may provide back-end computing system 104 with the user's token.

At step 506, back-end computing system 104 may identify a hashed verification document corresponding to the token. For example, back-end computing system 104 may analyze the metadata of the token to determine whether the verification document is stored on-chain or off-chain. If the verification document is stored on-chain, back-end computing system 104 may analyze the hashed contents contained in the metadata to determine whether back-end computing system 104 generated the hashed contents. If the verification document is stored off-chain, back-end computing system 104 may retrieve the hashed version of the verification document from its storage location and may analyze the hashed contents to determine whether back-end computing system 104 generated the hashed contents. Such process may be performed without decrypting the hashed contents because back-end computing system 104 may utilize a zero-knowledge proof protocol to hash the contents.

At step 508, back-end computing system 104 may determine whether the user's token is valid. If, at step 508, back-end computing system 104 determines that the user's token is not valid (i.e., back-end computing system 104 did not generate the hashed values), then method 500 proceeds to step 510. At step 510, back-end computing system 104 provides third party system 108 with an indication that the token is invalid.

If, however, at step 510, back-end computing system 104 determines that the user's token is valid (i.e., back-end computing system 104 did generate the hashed values), then method 500 proceeds to step 512. At step 512, back-end computing system 104 provides third party system 108 with an indication that the token is valid.

Figures 6A, 6B:
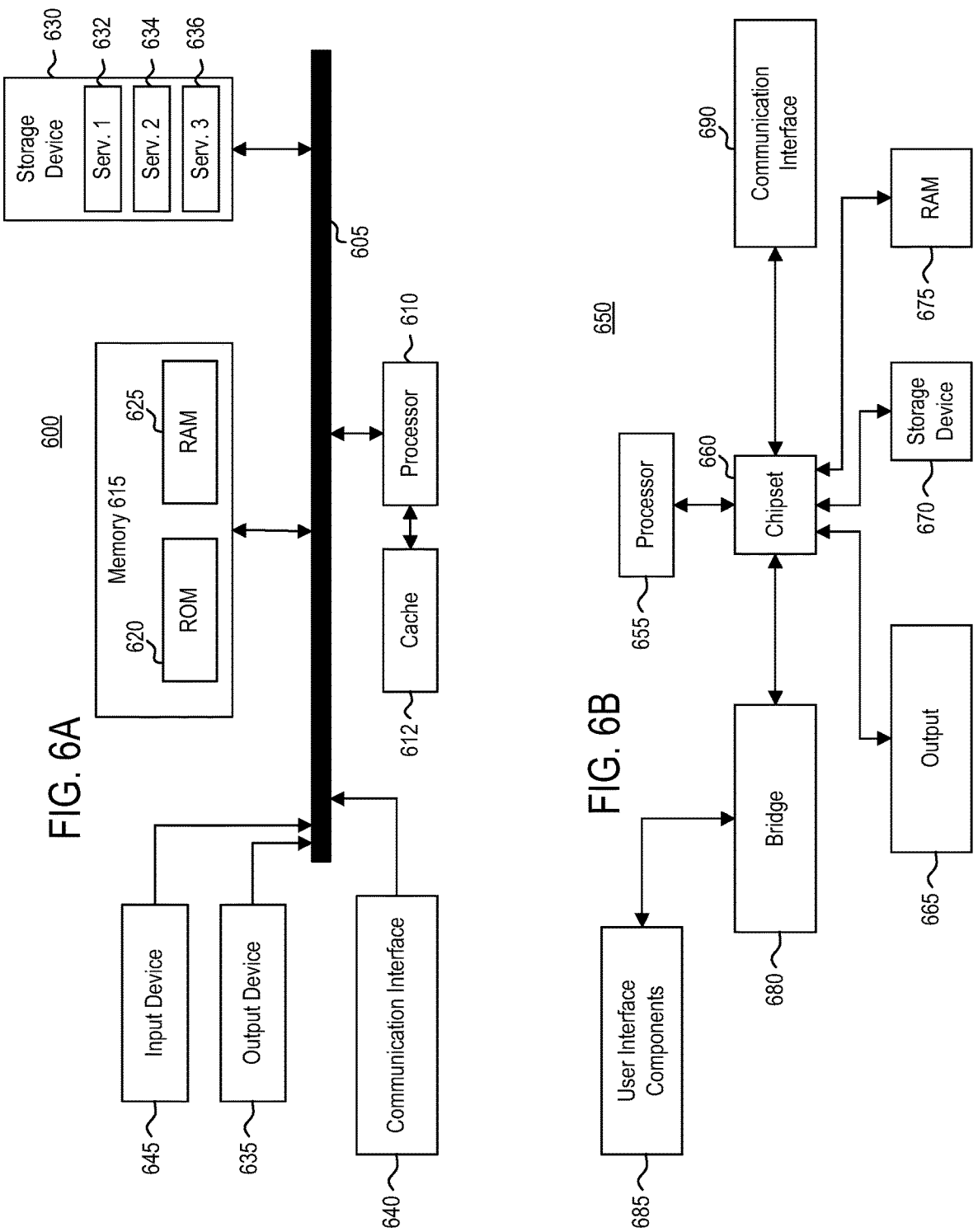
FIG. 6A illustrates a system bus computing system architecture, according to example embodiments.
FIG. 6B illustrates a computer system having a chipset architecture, according to example embodiments.

FIG. 6A illustrates an architecture of system bus computing system 600, according to example embodiments. One or more components of system 600 may be in electrical communication with each other using a bus 605. System 600 may include a processor (e.g., one or more CPUs, GPUs or other types of processors) 610 and a system bus 605 that couples various system components including the system memory 615, such as read only memory (ROM) 620 and random access memory (RAM) 625, to processor 610. System 600 can include a cache of high-speed memory connected directly with, in close proximity to, or integrated as part of processor 610. System 600 can copy data from memory 615 and/or storage device 630 to cache 612 for quick access by processor 610. In this way, cache 612 may provide a performance boost that avoids processor 610 delays while waiting for data. These and other modules can control or be configured to control processor 610 to perform various actions. Other system memory 615 may be available for use as well. Memory 615 may include multiple different types of memory with different performance characteristics. Processor 610 may be representative of a single processor or multiple processors. Processor 610 can include one or more of a general purpose processor or a hardware module or software module, such as service 1 632, service 2 634, and service 6 636 stored in storage device 630, configured to control processor 610, as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction with the system 600, an input device 645 which can be any number of input mechanisms, such as a microphone for speech, a touch-sensitive screen for gesture or graphical input, keyboard, mouse, motion input, speech and so forth. An output device 635 (e.g., a display) can also be one or more of a number of output mechanisms known to those of skill in the art. In some instances, multimodal systems can enable a user to provide multiple types of input to communicate with system 600. Communications interface 640 can generally govern and manage the user input and system output. There is no restriction on operating on any particular hardware arrangement and therefore the basic features here may easily be substituted for improved hardware or firmware arrangements as they are developed.

Storage device 630 may be a non-volatile memory and can be a hard disk or other types of computer readable media that can store data that are accessible by a computer, such as magnetic cassettes, flash memory cards, solid state memory devices, digital versatile disks, cartridges, random access memories (RAMs) 625, read only memory (ROM) 620, and hybrids thereof.

Storage device 630 can include services 632, 634, and 636 for controlling the processor 610. Other hardware or software modules are contemplated. Storage device 630 can be connected to system bus 605. In one aspect, a hardware module that performs a particular function can include the software component stored in a computer-readable medium in connection with the necessary hardware components, such as processor 610, bus 605, output device 635 (e.g., a display), and so forth, to carry out the function.

FIG. 6B illustrates a computer system 650 having a chipset architecture, according to example embodiments. Computer system 650 may be an example of computer hardware, software, and firmware that can be used to implement the disclosed technology. System 650 can include one or more processors 655, representative of any number of physically and/or logically distinct resources capable of executing software, firmware, and hardware configured to perform identified computations. One or more processors 655 can communicate with a chipset 660 that can control input to and output from one or more processors 655. In this example, chipset 660 outputs information to output 665, such as a display, and can read and write information to storage device 670, which can include magnetic media, and solid-state media, for example. Chipset 660 can also read data from and write data to storage device 675 (e.g., RAM). A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by one or more processors 655 analyzing data stored in storage device 670 or 675. Further, the machine can receive inputs from a user through user interface components 685 and execute appropriate functions, such as browsing functions by interpreting these inputs using one or more processors 655.

It can be appreciated that example systems 600 and 650 can have more than one processor 610 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method of verifying a user, comprising:

receiving, by a computing system, a request to verify a user, the request comprising an indication of a jurisdiction in which the user will be verified;

based on the request, collecting, by the computing system, information related to the user;

based on the request, identifying, by the computing system, a workflow corresponding to the jurisdiction, wherein the workflow defines a set of conditions specific to the jurisdiction for which the user is seeking a verified status;

executing, by the computing system, the workflow that is specific to the jurisdiction to verify the user in the jurisdiction, wherein executing the workflow comprises:

comparing the information related to the user to the conditions defined in the workflow;

determining a verification status of the user for the jurisdiction based, at least in part, on the comparing; and generating a verification record for the jurisdiction based, at least in part, on the verification status, wherein the verification record comprises the information considered during the comparing;

hashing, by the computing system, the verification record using a zero-knowledge proof protocol;

generating, by the computing system, a non-fungible token corresponding to the verification record, wherein the non-fungible token is associated with a hashed version of the verification record and verifies the user is accredited for the jurisdiction; and broadcasting, by the computing system, the non-fungible token to a blockchain.

2. The method of claim 1, wherein the request further comprises:

a second indication of a second jurisdiction in which the user will be verified.

3. The method of claim 2, further comprising:

identifying, by the computing system, a second workflow corresponding to the second jurisdiction, wherein the second workflow defines a second set of conditions for obtaining a second verified status in the second jurisdiction.

4. The method of claim 3, further comprising:

executing, by the computing system, the second workflow to verify the user in the second jurisdiction, wherein executing the second workflow comprises:

comparing the information related to the user to the second set of conditions defined in the second workflow;

determining a second verification status of the user based on the comparing; and generating a second verification record based on the second verification status, wherein the second verification record comprises the information considered during the comparing; and hashing, by the computing system, the second verification record using the zero-knowledge proof protocol.

5. The method of claim 4, further comprising:

associating the non-fungible token with the hashed version of the second verification record.

6. The method of claim 5, wherein a first storage location of the hashed version of the verification record and a second storage location of the hashed version of the second verification record are included in metadata of the non-fungible token.

7. The method of claim 5, wherein first hashed contents of the verification record and second hashed contents of the second verification record are included in metadata of the non-fungible token.

8. A non-transitory computer readable medium comprising one or more sequences of instructions, which, when executed by a processor, causes a computing system to perform operations comprising:

receiving, by the computing system, a request to verify a user, the request comprising an indication of a jurisdiction in which the user will be verified;

based on the request, collecting, by the computing system, information related to the user;

based on the request, identifying, by the computing system, a workflow corresponding to the jurisdiction, wherein the workflow defines a set of conditions specific to the jurisdiction for which the user is seeking a verified status;

executing, by the computing system, the workflow to verify the user, wherein executing the workflow comprises:

comparing the information related to the user to the conditions defined in the workflow;

determining a verification status of the user for the jurisdiction based, at least in part, on the comparing; and generating a verification record for the jurisdiction based, at least in part, on the verification status, wherein the verification record comprises the information considered during the comparing;

hashing, by the computing system, the verification record using a zero-knowledge proof protocol;

generating, by the computing system, a non-fungible token corresponding to the verification record, wherein the non-fungible token is associated with a hashed version of the verification record and verifies the user is accredited for the jurisdiction; and broadcasting, by the computing system, the non-fungible token to a blockchain.

9. The non-transitory computer readable medium of claim 8, wherein the request further comprises:

a second indication of a second jurisdiction in which the user will be verified.

10. The non-transitory computer readable medium of claim 9, further comprising:

identifying, by the computing system, a second workflow corresponding to the second jurisdiction, wherein the second workflow defines a second set of conditions for obtaining a second verified status in the second jurisdiction.

11. The non-transitory computer readable medium of claim 10, further comprising:

executing, by the computing system, the second workflow to verify the user in the second jurisdiction, wherein executing the second workflow comprises:

comparing the information related to the user to the second set of conditions defined in the second workflow;

determining a second verification status of the user based on the comparing; and generating a second verification record based on the second verification status, wherein the second verification record comprises the information considered during the comparing; and hashing, by the computing system, the second verification record using the zero-knowledge proof protocol.

12. The non-transitory computer readable medium of claim 11, further comprising:

associating the non-fungible token with the hashed version of the second verification record.

13. The non-transitory computer readable medium of claim 12, wherein a first storage location of the hashed version of the verification record and a second storage location of the hashed version of the second verification record are included in metadata of the non-fungible token.

14. The non-transitory computer readable medium of claim 12, wherein first hashed contents of the verification record and second hashed contents of the second verification record are included in metadata of the non-fungible token.

15. A system, comprising:

a processor; and a memory having programming instructions stored thereon, which, when executed by the processor, causes the system to perform operations comprising:

receiving a request to verify a user, the request comprising an indication of a jurisdiction in which the user will be verified;

based on the request, collecting information related to the user;

based on the request, identifying a workflow corresponding to the jurisdiction, wherein the workflow defines a set of conditions specific to the jurisdiction for which the user is seeking a verified status;

executing the workflow that is specific to the jurisdiction to verify the user in the jurisdiction, wherein executing the workflow comprises:

comparing the information related to the user to the conditions defined in the workflow;

determining a verification status of the user for the jurisdiction based, at least in part, on the comparing; and generating a verification record for the jurisdiction based, at least in part, on the verification status, wherein the verification record comprises the information considered during the comparing;

hashing the verification record using a zero-knowledge proof protocol;

generating a non-fungible token corresponding to the verification record, wherein the non-fungible token is associated with a hashed version of the verification record and verifies the user is accredited for the jurisdiction; and broadcasting the non-fungible token to a blockchain.

16. The system of claim 15, wherein the request further comprises:

a second indication of a second jurisdiction in which the user will be verified.

17. The system of claim 16, further comprising:

identifying a second workflow corresponding to the second jurisdiction, wherein the second workflow defines a second set of conditions for obtaining a second verified status in the second jurisdiction.

18. The system of claim 17, further comprising:

executing the second workflow to verify the user in the second jurisdiction, wherein executing the second workflow comprises:

comparing the information related to the user to the second set of conditions defined in the second workflow;

determining a second verification status of the user based on the comparing; and generating a second verification record based on the second verification status, wherein the second verification record comprises the information considered during the comparing; and hashing the second verification record using the zero-knowledge proof protocol.

19. The system of claim 18, further comprising:

associating the non-fungible token with the hashed version of the second verification record.

20. The system of claim 19, wherein a first storage location of the hashed version of the verification record and a second storage location of the hashed version of the second verification record are included in metadata of the non-fungible token.

* * * * *